United States Patent
Schimmel

(10) Patent No.: US 10,115,064 B2
(45) Date of Patent: Oct. 30, 2018

(54) BUSINESS STORYBOARDING

(71) Applicant: SugarCRM Inc., Cupertino, CA (US)

(72) Inventor: Karl R. Schimmel, Olathe, KS (US)

(73) Assignee: SUGARCRM INC., Cupertino, CA (US)

( * ) Notice: Subject to any disclaimer, the term of this patent is extended or adjusted under 35 U.S.C. 154(b) by 490 days.

(21) Appl. No.: 14/818,143

(22) Filed: Aug. 4, 2015

(65) Prior Publication Data

US 2017/0038932 A1    Feb. 9, 2017

(51) Int. Cl.
*G06F 3/00* (2006.01)
*G06Q 10/06* (2012.01)

(52) U.S. Cl.
CPC ................... *G06Q 10/063* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0199541 A1* | 10/2004 | Goldberg | ............... | G06Q 10/06 |
| 2005/0055635 A1* | 3/2005 | Bargeron | ............... | G06F 17/211 |
| | | | | 715/251 |
| 2005/0144096 A1* | 6/2005 | Caramanna, II | ....... | G06Q 40/06 |
| | | | | 705/30 |
| 2006/0005112 A1* | 1/2006 | Lilly | .................... | G06F 17/211 |
| | | | | 715/250 |
| 2006/0085744 A1* | 4/2006 | Hays | .................... | G06F 17/245 |
| | | | | 715/255 |
| 2008/0189724 A1* | 8/2008 | Tien | ........................ | G06Q 10/10 |
| | | | | 719/329 |
| 2008/0215984 A1* | 9/2008 | Manico | ............. | G06F 17/30035 |
| | | | | 715/730 |
| 2009/0096812 A1* | 4/2009 | Boixel | .................... | G06Q 10/00 |
| | | | | 345/646 |
| 2011/0246925 A1* | 10/2011 | Marchand | ............... | G06Q 10/06 |
| | | | | 715/772 |
| 2011/0280497 A1* | 11/2011 | Berger | ............. | G06F 17/30274 |
| | | | | 382/306 |
| 2012/0095817 A1* | 4/2012 | Kamil | ..................... | G06Q 30/02 |
| | | | | 705/14.4 |

(Continued)

*Primary Examiner* — Hien L Duong
(74) *Attorney, Agent, or Firm* — Steven M. Greenberg, Esq.; Shutts & Bowen LLP

(57) ABSTRACT

A storyboard generation method includes defining and persisting a template specifying a collection of visualizations in a storyboard, each visualization being generated based upon different data objects in an enterprise application for a business and each reflecting a performance aspect of the business. The method additionally includes partitioning the template into frames of a sequence and generating the storyboard by creating each of the visualizations based upon data objects of the enterprise application and allocating in the storyboard, a larger portion for visualizations that reflect an excess of performance beyond a threshold level and visualizations that reflect a dearth of performance below a threshold level, and a smaller portion for visualizations that reflect nominal performance. Finally, the method includes formatting the storyboard as a slideshow with each slide corresponding to one of the frames and saving the storyboard into fixed storage of the computer for subsequent playback.

15 Claims, 2 Drawing Sheets

(56) References Cited

U.S. PATENT DOCUMENTS

| | | | | |
|---|---|---|---|---|
| 2012/0117089 | A1* | 5/2012 | Matrat | G06F 17/30696 707/752 |
| 2012/0117473 | A1* | 5/2012 | Han | G11B 27/034 715/723 |
| 2012/0254053 | A1* | 10/2012 | Joa | G06F 17/30303 705/319 |
| 2013/0185624 | A1* | 7/2013 | Appleyard | G06Q 10/10 715/234 |
| 2013/0205199 | A1* | 8/2013 | Damera-Venkata | G06F 17/248 715/243 |
| 2014/0013212 | A1* | 1/2014 | Von Haden | G06F 17/248 715/243 |
| 2014/0157170 | A1* | 6/2014 | Elias | G06F 17/30525 715/771 |
| 2014/0184607 | A1* | 7/2014 | Toyoshima | G06F 17/2765 345/440 |
| 2015/0032685 | A1* | 1/2015 | Lingappa | G06Q 10/063 707/603 |
| 2015/0095119 | A1* | 4/2015 | Hariharan | G06Q 10/06393 705/7.39 |
| 2015/0169652 | A1* | 6/2015 | Nuraliev | G06F 17/30554 707/805 |
| 2015/0293678 | A1* | 10/2015 | Chainani | G06Q 10/10 705/14.66 |
| 2015/0310466 | A1* | 10/2015 | LaCivita | G06Q 30/0205 705/7.34 |

* cited by examiner

BUSINESS STORYBOARDING

BACKGROUND OF THE INVENTION

Field of the Invention

The present invention relates to business performance visualization and more particularly to the graphical interpretation of business performance.

Description of the Related Art

Business performance analysis has existed for centuries. Analyzing the health of a business begins with a view of revenues and expenses and continues through a deep view of trends in sales, pinpointing with some accuracy the source of revenue, and the relatedness of expenses to those revenues. Ultimately, the goal of business performance analysis is to facilitate decision making amongst the managers of the business including decisions relating to marketing expenditures, human resources, inventory level management and sales programming. Yet, absent the power of the computer processing, crunching the requisite data to produce a visualization of performance data in order to facilitate business performance analysis is a manually intensive task not easily undertaken.

The advent of the era of computing, however, has enabled business managers to collect data at an atomic level of business performance and to crunch an incredible volume of such data to produce a wide selection of visualizations illustrative of the performance not only of the business in its entirety, but also of the performance of different aspects of the business. Indeed, the different ways to report and visualize the performance of different aspects of a business is so robust, the ultimate analysis of the business can be lost in a sea of detailed imagery thus defeating the purpose, in the first instance, of generating the visualizations. As such, what is needed is a simplistic and stimulating way to present a visualization of the performance of a business.

BRIEF SUMMARY OF THE INVENTION

Embodiments of the present invention address deficiencies of the art in respect to business performance visualization and provide a novel and non-obvious method, system and computer program product for business storyboarding. In an embodiment of the invention, a storyboard generation method includes defining and persisting into memory of a computer, a template specifying a collection of visualizations in a storyboard, each visualization being generated based upon different data objects in an enterprise application for a business and each visualization reflecting a performance aspect of the business. The method additionally includes partitioning the template into frames of a sequence and generating the storyboard by creating each of the visualizations specified by the template based upon data objects of the enterprise application and allocating in the storyboard, a larger portion for visualizations that reflect an excess of performance beyond a threshold level and visualizations that reflect a dearth of performance below a threshold level, and a smaller portion for visualizations that reflect nominal performance. Finally, the method includes formatting the storyboard as a slideshow with each slide corresponding to one of the frames and saving the storyboard into fixed storage of the computer for subsequent playback.

In one aspect of the embodiment, the slideshow is stored in the fixed storage as a movie. In another aspect of the embodiment, the storyboard is played back by scrolling each slide in a display of the computer in the sequence specified by the template. In yet another aspect of the embodiment, one of the visualizations is a visualization of different sales opportunities for the business each of the opportunities being shown in the one of the visualizations in connection with a dollar value for each of the opportunities. Finally, in even yet another aspect of the embodiment, one of the visualizations is a visualization of different contacts for the business, each of the contacts being shown in the one of the visualizations in connection with a number of relationships to other data objects of the enterprise application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for business storyboarding. In accordance with an embodiment of the invention, a template can be persisted in fixed storage defining a collection of visualizations in a storyboard. Each visualization can generated based upon different data objects in an enterprise application for a business and each visualization can reflect a performance aspect of the business. Of note, the template is partitioned into frames of a sequence. Thereafter, the storyboard is generated by creating each visualization specified by the template based upon the data objects of the enterprise application storyboard. Visualizations that reflect an excess of performance beyond a threshold level are allocated a larger portion of the storyboard as are visualizations that reflect a dearth of performance below a threshold level. Visualizations that reflect nominal performance are allocated a smaller portion of the storyboard. The resultant storyboard then is formatted as either a tickertape, slideshow or movie.

Figure 1:
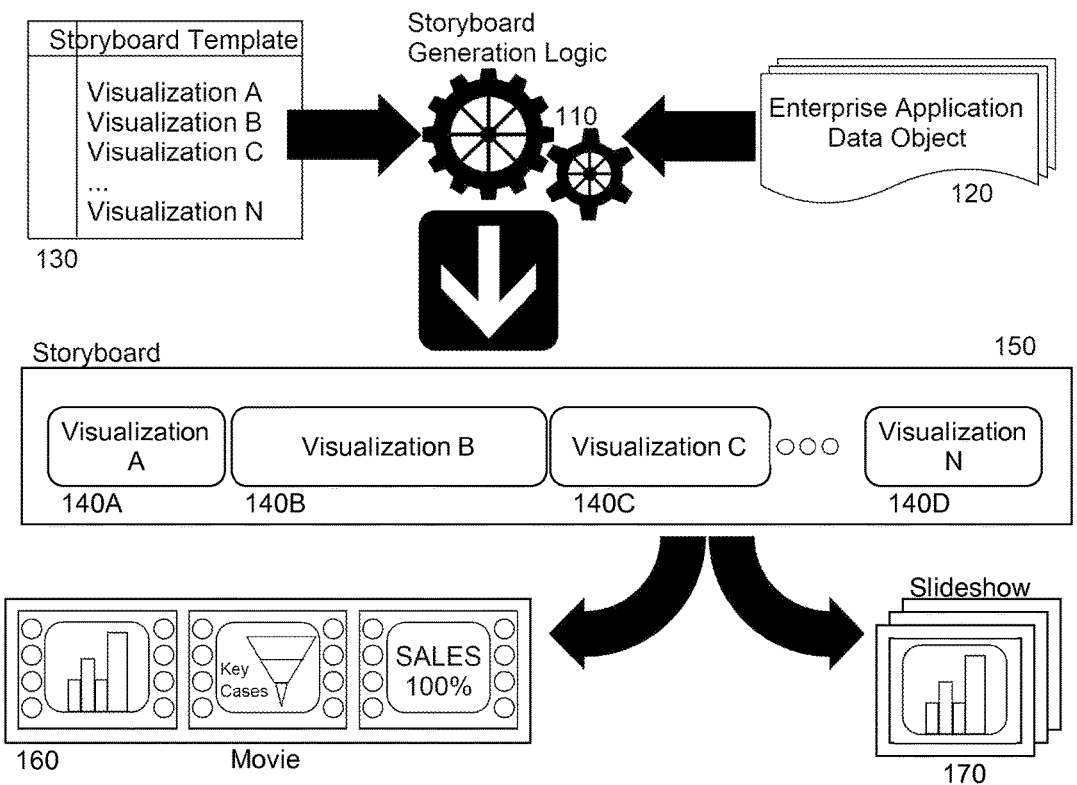
FIG. 1 is a pictorial illustration of a process for business storyboarding.

In further illustration, FIG. 1 pictorially shows a process for business storyboarding. As shown in FIG. 1, a storyboard template 130 is established providing for a selection of visualizations of an enterprise application to be included in a storyboard 150. Storyboard generation logic 110 loads the storyboard template 130 and identifies the list of visualizations to be considered for inclusion in the storyboard 150. Thereafter, the storyboard generation logic 110 generates the visualizations set forth in the storyboard template 130 utilizing different enterprise application data objects 120 of the enterprise application for a particular business, and filters the generated visualizations to include only those different visualizations 140A, 140B, 140C, 140D that reflect a performance of an underlying business above a threshold level.

The storyboard generation logic 110 then allocates different portions of the storyboard 150 to the different visualizations 140A, 140B, 140C, 140D depending upon a degree of performance of the particular business reflected by each of the different visualizations 140A, 140B, 140C, 140D. Ones of the different visualizations 140A, 140B, 140C, 140D of better performance are allocated a larger portion of the storyboard 150. Optionally, ones of the different visualizations 140A, 140B, 140C, 140D of poor performance also are allocated a larger portion of the storyboard 150. Thereafter, the storyboard 150 is persisted to memory and displayed in a portion of a user interface of the enterprise application, for example as a scrolling filmstrip 160 or scrolling slide show 170 in which the scrolling of the filmstrip 160 or slide show 170 can be manually paused, fast forwarded or rewound.

Figure 2:
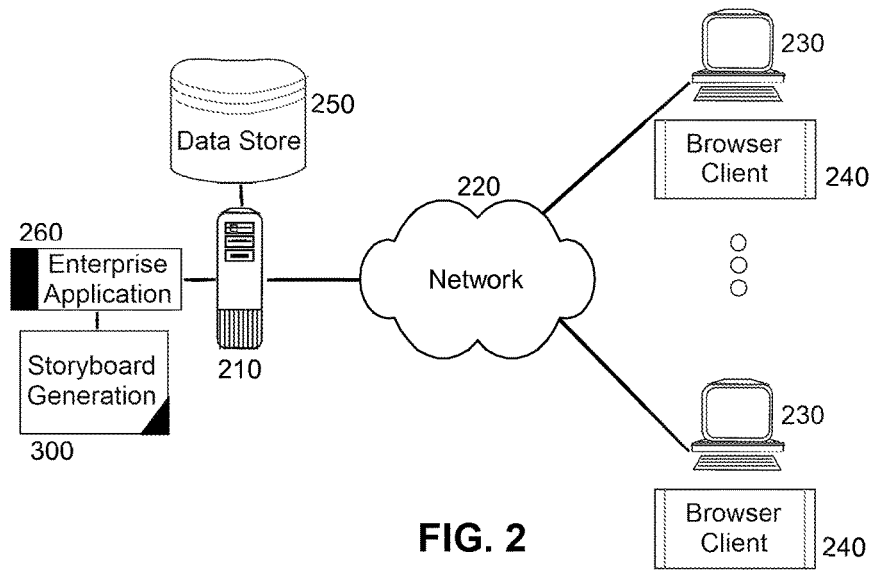
FIG. 2 is a schematic illustration of a data processing system configured for business storyboarding.

The process described in connection with FIG. 1 is implemented in a data processing system. In yet further illustration, FIG. 2 schematically shows a data processing system configured for business storyboarding. The system includes a host computing system 210 that includes one or more computers each with memory and at least one processor. The host computing system supports the operation of an enterprise application 260 managing the creation, access, modification and deletion of data in a data store 250 by end users utilizing different browser clients 240 in respectively different client computers 230 over computer communications network 220.

Notably, a storyboard generation module 300 is coupled to the enterprise application 260. The module 300 includes program code that when executed in the memory of the host computing system 210, is enabled to direct the generation by the enterprise application 260 of different visualizations based upon the data in the data store 250 for inclusion in a storyboard. The visualizations, however, are limited to those visualizations reflecting a threshold performance, good or bad, in connection with the enterprise application. Further, the portion of the storyboard allocated to each of the visualizations varies according to a degree of performance, good or bad, reflected in each of the visualizations. In this way, visualizations associated with the greatest or poorest performance in the enterprise applications are afforded the largest portion of the storyboard so as to call attention to those visualizations of greatest importance.

Figure 3:
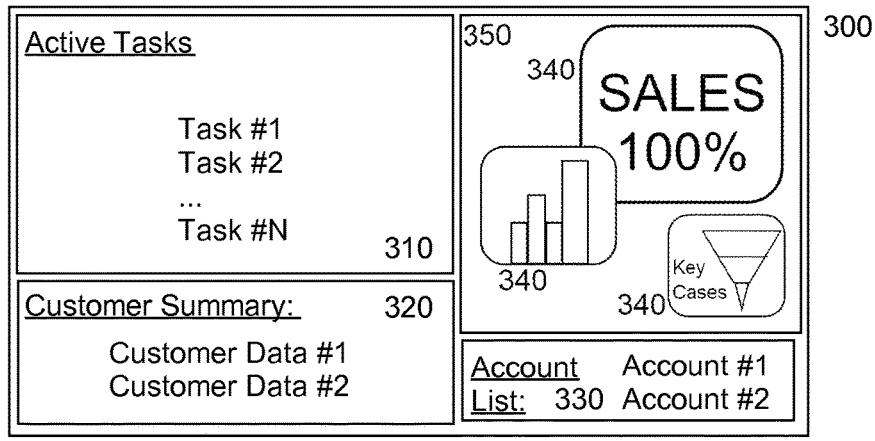
FIG. 3 is a screen shot of an exemplary enterprise application user interface configured for business storyboarding.

In further illustration of an exemplary embodiment of the storyboard, FIG. 3 is a screen shot of an exemplary enterprise application user interface configured for business storyboarding. As shown in FIG. 3, a user interface 300 of the enterprise application is provided to include different screens such as a screen of active tasks 310 to be performed in connection with an underlying business, a screen of customer summary information 320, a screen listing different customers 330 of the business and the storyboard 350. As can be seen, the storyboard 350 includes a selection of visualizations 340, with different ones of the visualizations allocated different portions of the storyboard 350 depending upon a threshold degree of performance reflected by the visualizations.

Figure 4:
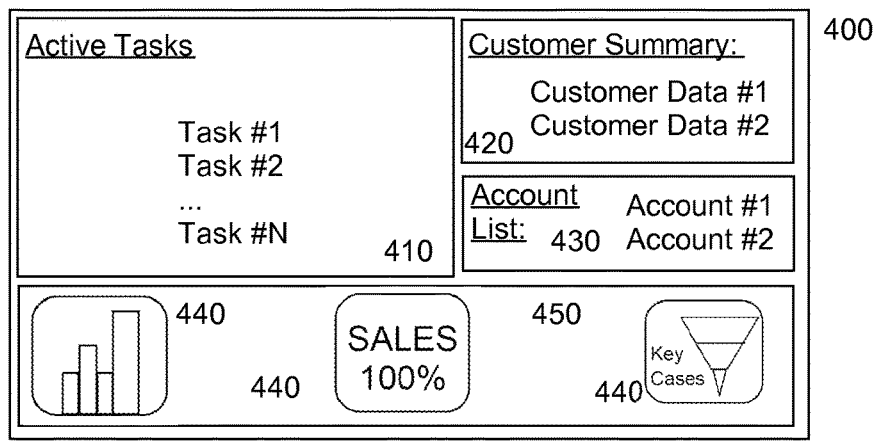
FIG. 4 is a screen short of an alternative exemplary enterprise application user interface configured for business storyboarding; and, FIG. 5 is a flow chart illustrating a process for business storyboarding.

FIG. 4 is a screen short of an alternative exemplary enterprise application user interface configured for business storyboarding. As shown in FIG. 4, a user interface 400 of the enterprise application is provided to include different screens such as a screen of active tasks 410 to be performed in connection with an underlying business, a screen of customer summary information 420, a screen listing different customers 430 of the business and the storyboard 450. As can be seen, the storyboard 450 is placed in the user interface 400 in the form of a film strip and includes a selection of visualizations 440, with different ones of the visualizations allocated different portions of the storyboard 350 depending upon a threshold degree of performance reflected by the visualizations. Optionally, each of the visualizations 440 can be activatable in the storyboard 450 such that a selection of one of the visualizations 440 results in a loading and display in a window of the user interface 400 of an underlying data object.

Figure 5:
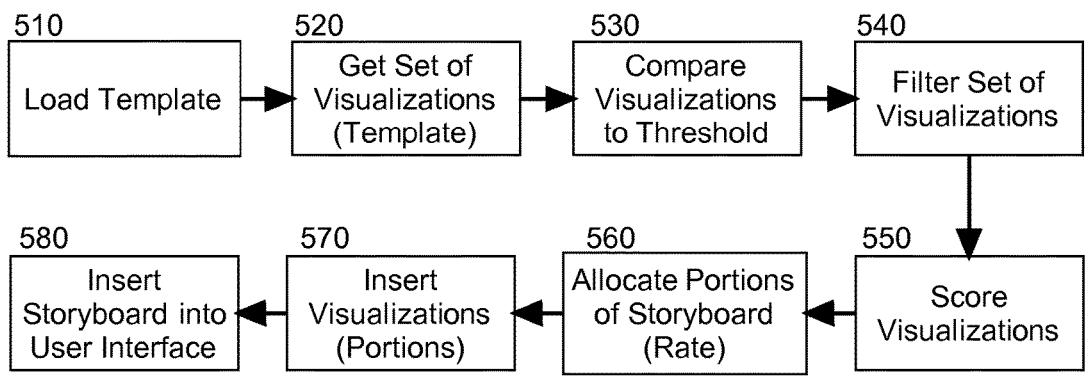

In even yet further illustration of the operation of the storyboard generation module 300 of FIG. 3, FIG. 5 is a flow chart illustrating a process for business storyboarding. Beginning in block 510, a storyboard template is loaded into memory and in block 530, a set of visualizations specified by the template are generated utilizing data objects of the enterprise application in respect to a particular business. In block 530, performance of the business reflected in each of the visualizations each is compared to a threshold value so that in block 540, visualizations associated with the performance of the business that does not meet the threshold value are filtered from the set.

In block 550, each of the visualizations remaining in the filtered set are scored according to a degree of performance of the business reflected in each of the visualizations. For instance, the scoring can refer to a dollar value of the performance of the business, a value assigned in terms of a marketing lead score, or a priority of a particular customer or project assigned to an underlying customer or project, or a time constraint applied to a particular task with visualizations pertaining to more time pressing tasks afforded a higher score than visualizations pertaining to less time pressing tasks. Subsequently, in block 560 the visualizations in the filtered set each are allocated a different portion of different size of the storyboard depending upon the score so that higher scored visualizations are allocated larger portions of the storyboard. Finally, in block 570, the visualizations are resized and placed into the respectively different allocated portions of the storyboard and in block 580 the storyboard is displayed in a user interface of the enterprise application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following:

a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A storyboard generation method comprising:
defining and persisting into memory of a computer, a template specifying a collection of visualizations in a storyboard, each visualization being generated based upon different data objects in an enterprise application for a business and each visualization reflecting a performance aspect of the business;
partitioning the template into frames of a sequence;
generating the storyboard by creating each of the visualizations specified by the template based upon data objects of the enterprise application and allocating in the storyboard, a larger portion for visualizations that reflect an excess of performance beyond a threshold level and visualizations that reflect a dearth of performance below a threshold level, and a smaller portion for visualizations that reflect a nominal performance relative to a threshold level;
formatting the storyboard as a slideshow with each slide corresponding to one of the frames; and,
saving the storyboard into fixed storage of the computer for subsequent playback.

2. The method of claim 1, wherein the slideshow is stored in the fixed storage as a movie.

3. The method of claim 1, further comprising playing back the storyboard by scrolling each slide in a display of the computer in the sequence specified by the template.

4. The method of claim 1, wherein one of the visualizations is a visualization of different sales opportunities for the business each of the opportunities being shown in the one of the visualizations in connection with a dollar value for each of the opportunities.

5. The method of claim 1, wherein one of the visualizations is a visualization of different contacts for the business, each of the contacts being shown in the one of the visualizations in connection with a number of relationships to other data objects of the enterprise application.

6. A computer program product for storyboard generation, the computer program product comprising a computer readable storage medium having program instructions embodied therewith, the program instructions executable by a device to cause the device to perform a method comprising:
defining and persisting into memory of a computer, a template specifying a collection of visualizations in a storyboard, each visualization being generated based upon different data objects in an enterprise application for a business and each visualization reflecting a performance aspect of the business;
partitioning the template into frames of a sequence;
generating the storyboard by creating each of the visualizations specified by the template based upon data objects of the enterprise application and allocating in the storyboard, a larger portion for visualizations that reflect an excess of performance beyond a threshold level and visualizations that reflect a dearth of performance below a threshold level, and a smaller portion for visualizations that reflect a nominal performance relative to a threshold level;
formatting the storyboard as a slideshow with each slide corresponding to one of the frames; and,
saving the storyboard into fixed storage of the computer for subsequent playback.

7. The computer program product of claim 6, wherein the slideshow is stored in the fixed storage as a movie.

8. The computer program product of claim 6, wherein the method further comprises playing back the storyboard by scrolling each slide in a display of the computer in the sequence specified by the template.

9. The computer program product of claim 6, wherein one of the visualizations is a visualization of different sales opportunities for the business each of the opportunities being shown in the one of the visualizations in connection with a dollar value for each of the opportunities.

10. The computer program product of claim 6, wherein one of the visualizations is a visualization of different contacts for the business, each of the contacts being shown in the one of the visualizations in connection with a number of relationships to other data objects of the enterprise application.

11. A data processing system configured for storyboard generation, the system comprising:
a host computing system comprising one or more computers each with memory and at least one processor;
an application executing in the host computing system; and,
a storyboard generation module coupled to the application, the module comprising program code enabled upon execution in the host computing system to to define and persist into memory of a computer, a template specifying a collection of visualizations in a storyboard, each visualization being generated based upon different data objects in an enterprise application for a business and each visualization reflecting a performance aspect of the business, to partition the template into frames of a sequence, to generate the storyboard by creating each of the visualizations specified by the template based upon data objects of the enterprise application and allocating in the storyboard, a larger portion for visualizations that reflect an excess of performance beyond a threshold level and visualizations that reflect a dearth of performance below a threshold level, and a smaller portion for visualizations that reflect a nominal performance relative to a threshold level, to format the storyboard as a slideshow with each slide corresponding to one of the frames, and to save the storyboard into fixed storage of the computer for subsequent playback.

12. The system of claim 11, wherein the slideshow is stored in the fixed storage as a movie.

13. The system of claim 11, further comprising program code to play back the storyboard by scrolling each slide in a display of the computer in the sequence specified by the template.

14. The system of claim 11, wherein one of the visualizations is a visualization of different sales opportunities for the business each of the opportunities being shown in the one of the visualizations in connection with a dollar value for each of the opportunities.

15. The system of claim 11, wherein one of the visualizations is a visualization of different contacts for the business, each of the contacts being shown in the one of the visualizations in connection with a number of relationships to other data objects of the enterprise application.

* * * * *